United States Patent [19]

Hubbard et al.

[11] Patent Number: 4,898,416
[45] Date of Patent: Feb. 6, 1990

[54] PICKUP DEVICE

[75] Inventors: Robert F. Hubbard, Buena Park; Joseph M. Jacobs, Redondo Beach, both of Calif.

[73] Assignee: Hughes Aircraft Company, Los Angeles, Calif.

[21] Appl. No.: 215,180

[22] Filed: Jul. 5, 1988

[51] Int. Cl.$^4$ ................................................. B25B 7/18
[52] U.S. Cl. ................................... 294/119.1; 294/106; 901/32; 901/39; 29/741
[58] Field of Search ................... 294/119.1, 106, 81.61, 294/907; 29/741, 759; 901/31–33, 37, 39; 414/736; 269/229, 230, 233; 279/114

[56] References Cited

U.S. PATENT DOCUMENTS

| | | | |
|---|---|---|---|
| 4,240,660 | 12/1980 | Roth et al. | 294/81.61 X |
| 4,402,541 | 9/1983 | Bomberger et al. | 294/81.61 |
| 4,482,289 | 11/1984 | Inaba et al. | 414/736 |
| 4,579,380 | 4/1986 | Zaremsky et al. | 294/119.1 |
| 4,696,503 | 9/1987 | Collodel | 294/119.1 X |
| 4,765,669 | 8/1988 | Meier | 294/119.1 |

Primary Examiner—Margaret A. Focarino
Assistant Examiner—Dean J. Kramer
Attorney, Agent, or Firm—Leonard A. Alkov; Wanda Denson-Low

[57] ABSTRACT

Pickup device (24) is for mounting on the mounting plate of a positioning robot. The pickup device has a frame (30) which carries movable carriages (36, 38). Cam ring (50) controls the position of the carriages. Downwardly depending arms (60, 62) carry pairs of levers thereon. The levers have facing sloped cam surfaces (84, 86) which are spread by downward thrust of closing pin 88. When the closing pin drops too far, it indicates lack of grasp and this is signaled by contacts (114, 116).

17 Claims, 4 Drawing Sheets

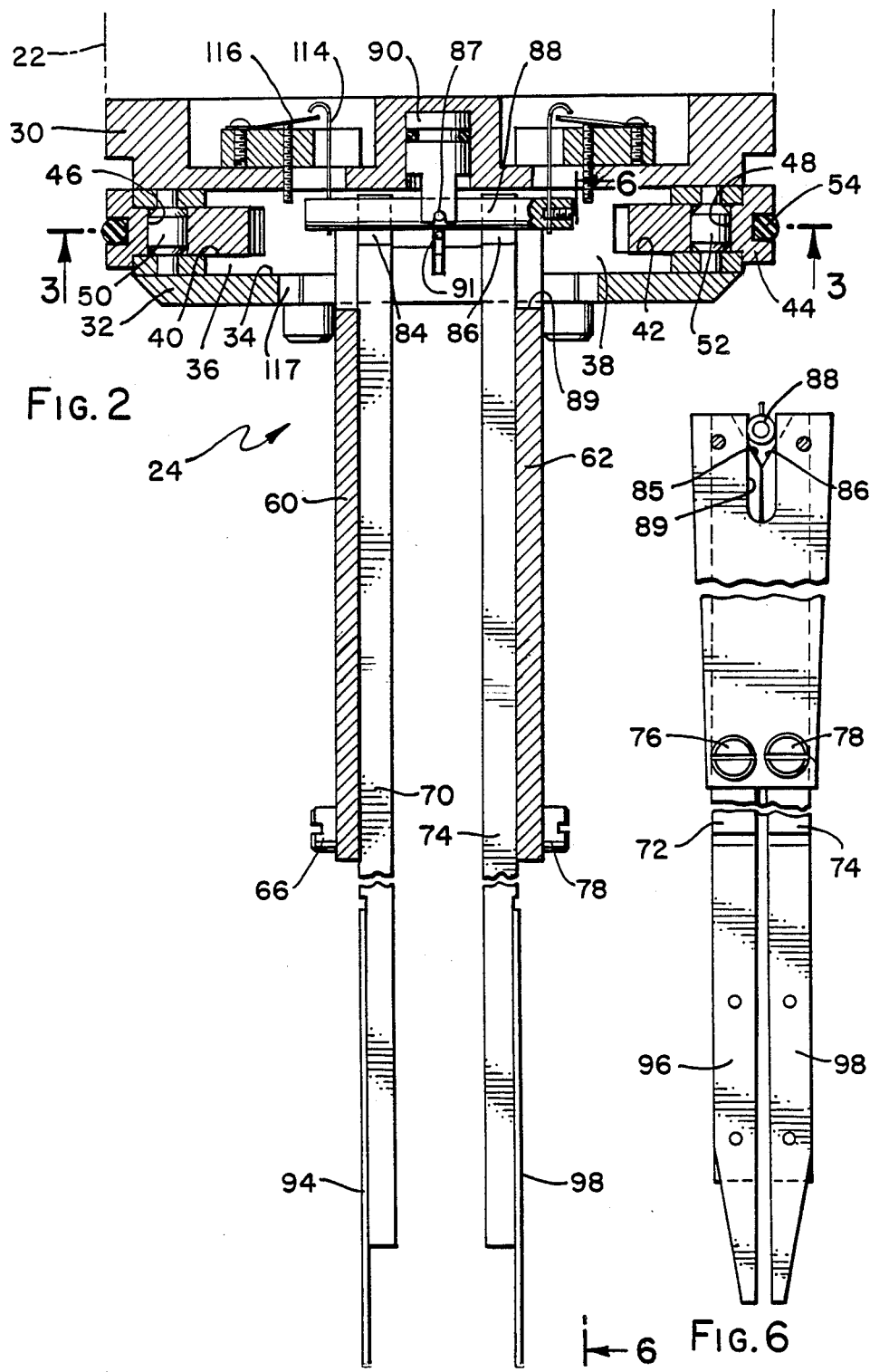

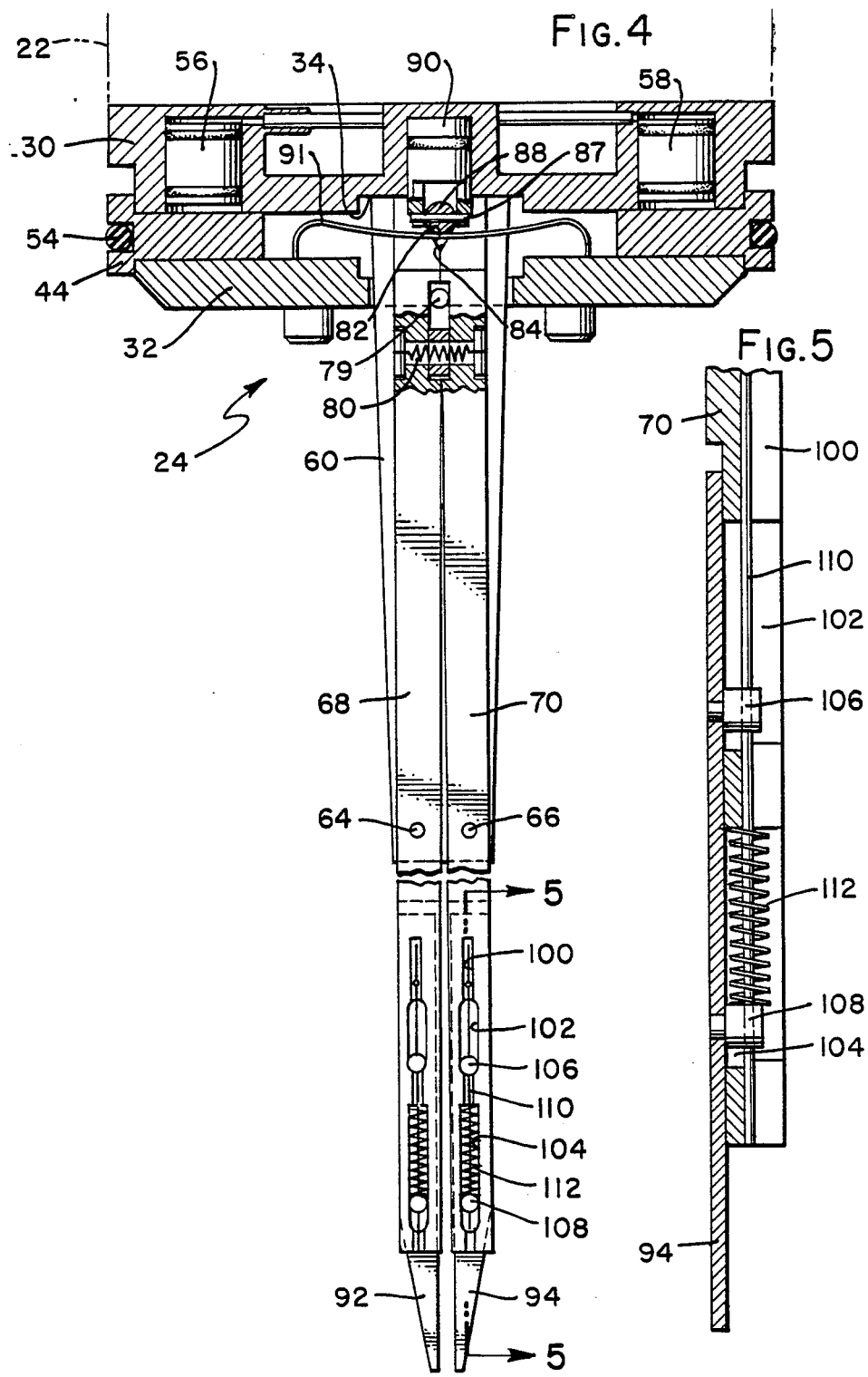

PICKUP DEVICE

FIELD OF THE INVENTION

This invention is directed to a device for picking up, grasping and positioning electrical parts with wire leads thereon and arranged to apply equal grasp to both leads. The device can be adjusted to various lengths.

BACKGROUND OF THE INVENTION

Assembly requires the placement of one part upon another. In the past, this has been manually accomplished, particularly in those cases where small parts of different sizes and shapes were to be placed upon different locations on a larger support. Automated assembly technology originated in the placement of the same size part in the same location, and then proceeded to placement of the same size part in different locations. This type of assembly is particulary noticed on a printed wiring board where complex wiring interconnections can be provided by etched conductive paths on a dielectric board. Components are placed in position on the printed wiring board and are secured thereon. In handling such components, most of the prior art developments were in the category of dedicated tooling, where the tooling is designed to perform one function or handle components of a single size. Such dedicated tooling is expensive, if it can only be used in such a limited manner. In addition, such dedicated tooling does not have the adaptability to handle components of different sizes in the same series of assembly operations. Therefore, such assembly equipment is of limited scope and value. Thus, there is need for assembly devices which have a broad scale of utility and which can handle parts of different sizes.

SUMMARY OF THE INVENTION

In order to aid in the understanding of this invention, it can be stated in essentially summary form that it is directed to a pickup device which has first and second pairs of fingers with adjustment means to adjust the distance between the fingers. The device also closes the fingers in such a manner that substantially equal holding force is provided between the pairs of fingers even if the leads are not of equal diameter. A sensor may be provided to determine when a finger does not have grasp of the component.

It is thus a purpose and advantage of this invention to provide a pickup device which has a wide range of manufacturing capability by providing the capability of handling a multiplicity of parts of different size without incurring machine down time to change tooling.

It is another purpose and advantage of this invention to provide more production time by eliminating off-line size adjustment of the pickup device.

It is another purpose and advantage of this invention to provide a pickup device which is capable of handling a variety of component sizes without interrupting production, which might otherwise be required in order to change pickup tooling.

It is a further purpose and advantage of this invention to provide a pickup device wherein each finger closes by moving a substantial and equal distance from its fully open position until it meets the component lead. When the mating fingers close and grip the component lead, the centerline of the lead will always be at the same location in spite of variations in lead diameter. This finger motion ensures that the component lead will be placed consistently and accurately.

It is another purpose and advantage of this invention to provide a structure wherein the finger gripping force applied to the component leads can be varied to accommodate both massive components and components with delicate leads.

It is a further purpose and advantage of this invention to provide an electronic part pickup device which can be attached to the arm of a robot which is capable of multiple axis motion and positioning so as to position parts as located on the X-, Y- and Z-axes, including rotation about the Z-axis.

Other purposes and advantages of this invention will become apparent from a study of the following portion of this specification, the claims and the attached drawings.

BRIEF DESCRIPTION OF THE DRAWINGS

FIG. 2 is a central section through the pickup device with parts broken away and parts taken in section.

FIG. 4 is a view similar to FIG. 2, but at right angles with respect thereto, with parts broken away and parts taken in section.

FIG. 5 is an enlarged section of one of the fingers, as seen generally along line 5—5 of FIG. 4.

FIG. 6 is an enlarged side-elevational view of one of the pairs of fingers mounted on their levers which are pivoted on the support arm.

DESCRIPTION OF THE PREFERRED EMBODIMENT

Figure 1:
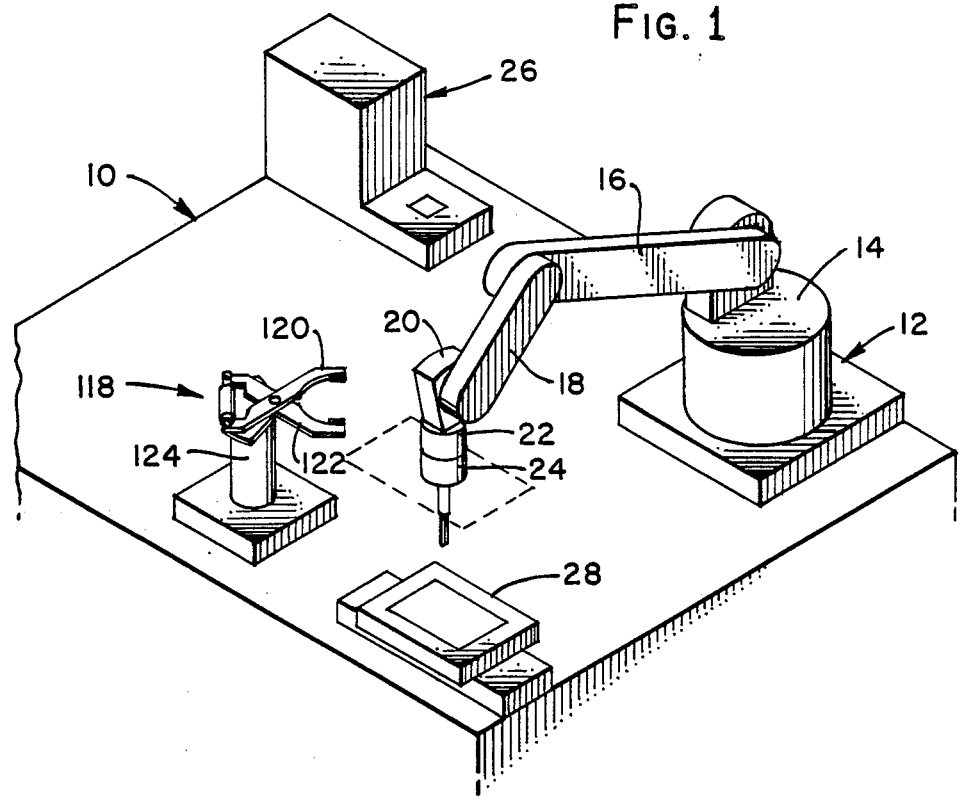
FIG. 1 is an isometric view of an assembly system which incorporates the pickup device of this invention.

In FIG. 1, an assembly station is generally indicated at 10. The assembly station has a programmable positioning device which may be called a robot. The robot device is generally indicated at 12. The robot has a stand 14 which is rotatable upon a vertical axis on its base, which is in turn secured on the table of the assembly station 10. Stand 14 has arms 16, 18 and 20 successively pivoted to each other. Robot arm 20 has mounting plate 22 on its end. The face of the mounting plate 22 is the face upon which the pickup device 24 of this invention is mounted. It can be seen that the robot can position the pickup device anywhere in X, Y and Z coordinates, using the top of the assembly station as a reference. In addition, the mounting plate 22 rotates around an axis, which is the Z-axis when positioned as shown in FIG. 1. The rotational axis of the mounting plate 22 can be angularly moved with respect to the Z-axis, although this capability is not employed with the pickup device of this invention in its usual pickup modes. Each of the robot arms pivots and rotational pivots is powered and feedback signaling of position is available so that the mounting plate can be moved into any desired position. For automated assembly, these position signals are provided by computer control.

Dispensing station 26 is positioned at the assembly station. The dispensing station 26 dispenses electronic components which can be picked up by the pickup device 24 and moved to a selected position. The dispensed at station 26, for example, are cylindrical components with an electric wire lead extending from each end thereof. The leads are bent in zee shape so that the leads can lie against a surface while the larger diameter of the body of the electrical component lies against or is spaced from the surface. It is to be noted that such electrical component have different lengths and different lead diameters.

Printed wiring board 28 is the location on which the electrical components will be placed, with the leads against the printed wiring board for soldering at a particular location with respect thereto. Thus, electrical components are picked up by the pickup device 24 at the dispensing station 26 and these electrical components are carried to the printed wiring board 28 and held thereon while they are attached thereto. Attachment may be by reflow soldering when solder heater bars are held in contact with the leads while the leads are held against the printed wiring board.

FIGS. 2 and 4 show vertical sections, at right angles to each other, through the center line of the pickup device 24. Frame 30 mounts directly to the mounting plate 22. In addition to structural support, there are electrical and fluid connections. Frame 30 with its cover 32 defines rectangular guide surfaces 34 which extend across the frame. These guide surfaces are shown in dashed lines in FIG. 3. Carriages 36 and 38 are rectangular on the outer surfaces and are slidably positioned on the guide surfaces 34. The carriages are bifurcated on their outer ends to respectively define forks 40 and 42, see FIG. 2.

Figure 3:
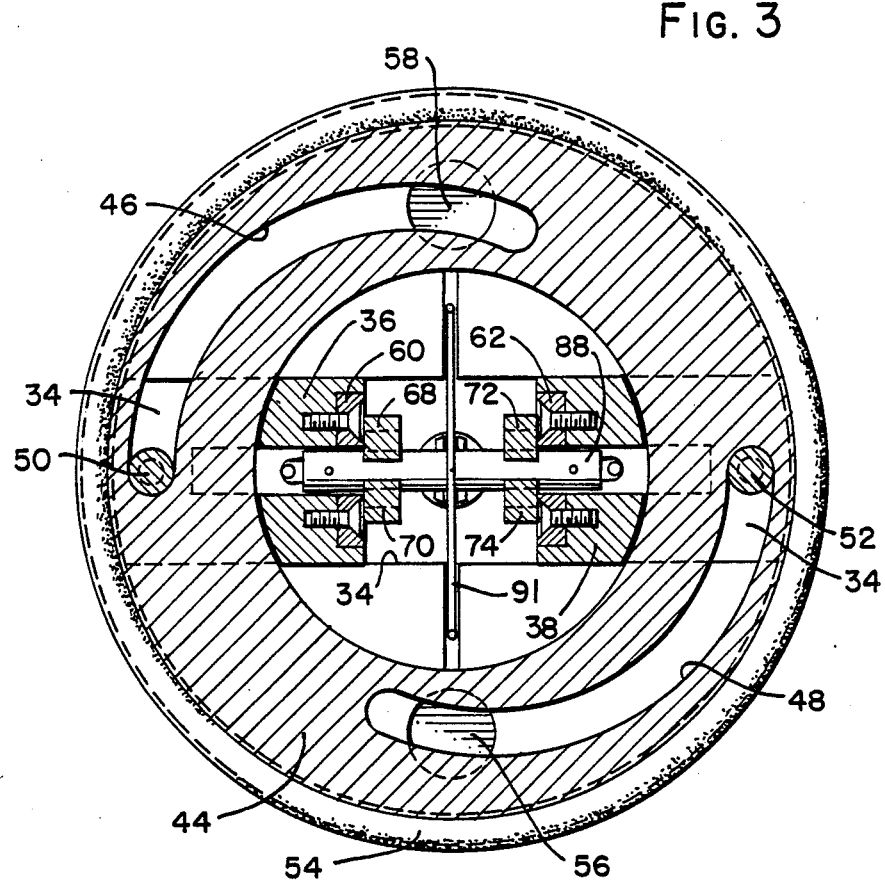
FIG. 3 is an upwardly looking section within the head of the pickup device, as seen generally along line 3—3 of FIG. 2.

Adjustment ring 44 lies enclosed within those forks. The upward view in FIG. 3 is taken through the bifurcation. The adjustment ring has spiral slots 46 and 48 therein. Rollers 50 and 52 respectively engage in the spiral slots and are mounted between the fingers of the bifurcated carriages, see FIG. 2. The spiral shapes are preferably such that, for equiangular rotation of the adjustment ring 44, the two carriages each move the same distance in opposite directions, and angular rotation is preferably directly proportional to the amount of carriage movement. Resilient ring 54 is preferably installed in a groove on the outer periphery of the adjustment ring 44 to aid in grasping the adjustment ring for its rotation with respect to frame 30 for adjustment in carriage spacing. Pistons 56 and 58 are provided in appropriate bores in frame 30. The pistons can forcibly engage down upon adjustment ring 44 when the pistons are supplied with fluid pressure thereabove, in order to lock the adjustment ring 44 in place at a particular spacing.

Finger supporting arms 60 and 62 are respectively secured on the carriages 36 and 38, as seen in FIG. 3. They depend downwardly. Levers 68 and 70 are respectively pivoted on pivot pins 64 and 66 on arm 60. These comprise a pair of levers which act together. Another pair of levers 72 and 74 are pivoted on pivot pins 76 and 78, see FIG. 6, to comprise another pair of levers. The pairs of levers are each drawn together at their top by means of a tension spring until they contact the out stop, with tension spring 80 being shown for the levers 68 and 70 in FIG. 4. This urges the bottom ends of the levers to separate. Stop pin 79 is fixedly held in cover 32 and is positioned between the upper ends of the levers. The out stop pin 79 is received in pockets in the levers, as is seen in FIG. 4 so that when the top ends of the levers come together, they are centered.

Facing divergent cam surfaces are provided at the tops of each pair of levers. These divergent cam surfaces on levers 68 and 70 are indicated at 82 and 84 in FIG. 4 and at 84 and 86 on levers 70 and 74 in FIGS. 2 and 6. Closing pin 88 lies across these surfaces. Closing pin 88 is carried on wrist pin 87 which is driven downward by closing piston 90. Closing piston 90 is fluid powered, and control of the fluid pressure controls finger gripping force. When pin 88 moves downwardly, it separates the cam surfaces at the top and stretches tension spring 80 to move the lower ends of the levers towards each other. Closing pin 88 moves down in slots in arms 60 and 62. Slot 89 is seen in arm 62 in FIG. 6. This causes each lever of a pair of levers to close at the same angular rate and to stay symmetrical about the center line. Closing pin 88 is mounted to rock on wrist pin 87 which engages through piston 90. This provides a rocking axis on wrist pin 87 transverse to the closing pin 88. The closing pin can rock to apply equal force to all four cam surfaces to close the two pairs of levers even if one pair of fingers must close a greater distance to grip its lead. U-shaped spring wire 91 lies under closing pin 88 to move it upward away from the cam surfaces when no fluid pressure is applied to piston 90. Thus, in the unactuated position, the lower ends of the levers are opened.

The lower ends of the levers may be shaped and employed to grasp the parts in question. However, to provide pickup safety, spring fingers are mounted on the ends of the levers for the actual pickup duty. Each of the spring fingers is identical, with spring fingers 92 and 94 mounted on the ends of levers 68 and 70, as seen in FIG. 4, and spring fingers 96 and 98 mounted upon levers 72 and 74, as seen in FIG. 6. Spring finger 94 is shown in detail in FIG. 5, and the rest are the same. Lever 70 has a groove 100 at its back and slots 102 and 104 therethrough lying on the groove. Finger 94 carries bosses 106 and 108 thereon which have a hole therethrough. Guide wire 110 lies in groove 100 and passes through the holes in the bosses 106 and 108 to thus permit sliding of the finger on the lever in the direction defined by the guide wire. The amount of motion is limited by the bosses engaging the ends of their respective slots. The finger is spring-urged downwardly by means of compression spring 112 which is engaged in slot 104 and against the top of boss 108. In this way, the fingers are resiliently urged downward. They are urged in this direction so that they will not damage material against which they may inadvertently engage, and also that the fingers will not be broken as they might be if they were rigidly mounted.

The robot 14 carries the pickup device over to the dispensing station to pick up a part, usually an electronic part such as a resistor with a wire at each end. These wires are respectively grasped by each pair of fingers. Should one or both of the fingers fail to grasp the part, that end of the closing pin 88 drops too low because the fingers close completely. When that happens, contact wire 114, see FIG. 2, engages on contact blade 116 to indicate that nothing has been grasped and that the fingers are too close to each other to represent grasp on the part. This signals the system that pickup of a part has not been accomplished. Access hole 118 permits adjustment of the screw under blade 116 to adjust the no-part sensor. A similar contact wire and similar contact blade are shown at the other end of closing pin 88 in FIG. 2 so that this signal is produced when either pair of fingers does not have a part in its grasp.

Figure 7:
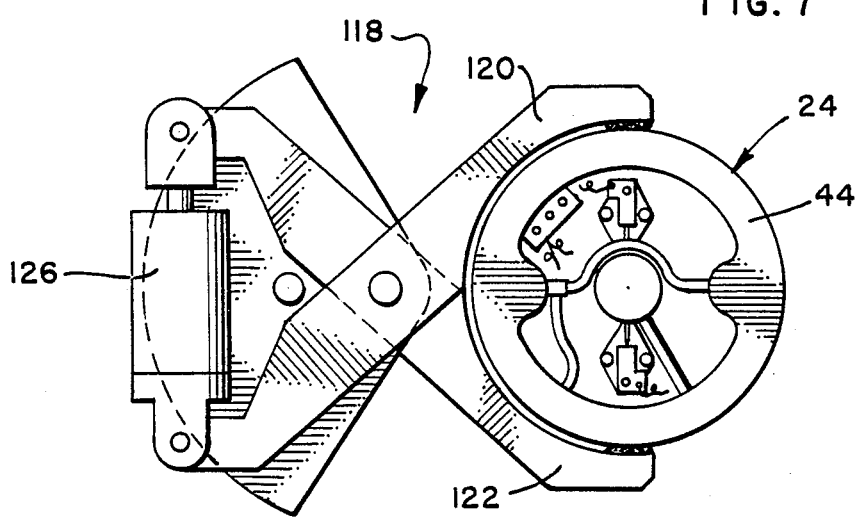
FIG. 7 is a plan view of a clamp device which performs adjustment of the pickup device of this invention, together with the pickup device shown in association therewith.

The adjustment of the spacing between levers 70 and 74 has been previously discussed, by virtue of motion of the carriages 36 and 38 towards and away from each other. Adjustment of the spacing can be accomplished during production by releasing the brake pistons 56 and 58 and rotating adjustment ring 44. Adjustment station 118 shown in FIG. 1 comprises a scissor clamp having arms 120 and 122 mounted on post 124. The scissor clamp arms are closed by extension of cylinder 126, see FIG. 7. Thus, when the adjustment ring 44 is placed within the clamp arms and the clamp arms close on the adjustment ring, the frame 30 of the pickup device can be rotated by rotation of the mounting plate 22 on the robot. This can be programmed into the robot operational sequence. Thus, the pickup device can sequentially pick up parts of different lengths without downtime and tool changing, by moving the pickup device to the adjustment station 118 for resetting of the spacing between the finger supporting arms 60 and 62. In this way, parts of various sizes can be reliably picked up and positioned.

This invention has been described in its presently contemplated est mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A pickup device comprising:
   a frame for attachment to a movable arm so that said pickup device can be moved to a desired location, said frame having guide means thereon wherein said frame has a brake thereon for selective engagement with an adjustment ring to that said adjustment ring can be held in position when not being adjusted;
   first and second carriages on said frame, said carriages being mounted on said guide means for guidance of said carriages;
   adjustment means on said frame for adjusting the space between said carriages;
   first and second arms respectively mounted on said first and second carriages so that by adjustment of said carriages along said guide means, the spacing between said arms can be adjusted wherein said means for adjusting said carriages along said guide means comprises said adjustment ring having first and second cam surfaces thereon, said first and second carriages being respectively engaged with said first and second cam surfaces so that rotation of said ring moves said carriages along said guide means:
   first and second pairs of fingers mounted so as to pivot on said arms so that said fingers can be moved with said frame; and
   means for opening and closing said fingers so that said pairs of fingers can grasp parts to be picked up, moved and positioned.

2. The pickup device of claim 1 wherein said guide means comprises guide surfaces in said frame.

3. The pickup device of claim 2 wherein said guide surfaces are substantially rectangular guide surfaces and said carriages are substantially rectangular blocks, said carriages being bifurcated and having a cam follower extending between said bifurcation, said cam surfaces being spiral slots in said adjustment ring and said cam followers respectively extending through said spiral slots so that rotation of said adjustment ring causes motion of said carriages towards and away from each other.

4. The pickup device of claim 1 further including means for controlling the finger gripping force on a part being gripped thereby.

5. The pickup device of claim 1 wherein said first and second arms respectively depend from said first and second carriages and first and second pairs of levers are respectively pivoted on said first and second arms, said first and second pairs of levers carrying said first and second pairs of fingers thereon.

6. The pickup device of claim 5 wherein said first and second pairs of levers are respectively resiliently urged together between said pivot on said arm and said carriage so that said first and second pairs of fingers are respectively resiliently separated and there is means on said frame for separating said levers in said first pair and said levers in said second pair so that said pairs of fingers respectively on said first and second pairs of levers close towards each other.

7. The pickup device of claim 6 wherein said means for separating said levers comprises cam surfaces on each of said levers, said cam surfaces being sloped and facing each other and said means further includes a closing pin positioned between said surfaces and there is a driver for said closing pin so that motion of said closing pin towards said lever pivots rotates said lever to close said fingers towards each other.

8. The pickup device of claim 7 wherein there is means for confining the motion of said closing pin to motion in a plane so that each finger closes an equal distance to a fixed center plane.

9. The pickup device of claim 7 wherein said closing pin is pivoted so that the same closing force is applied to each of said cam surfaces on said levers.

10. The pickup device of claim 9 wherein said closing pin has a signaling device thereon so that when said closing pin moves sufficiently far to indicate that a pair of fingers is closed without grasping material therebetween, a signal is emitted.

11. The pickup device of claim 9 wherein said means for adjusting said carriages along said guide means comprises a ring having first and second cam surfaces thereon, said first and second carriages being respectively engaged with said first and second cam surfaces so that rotation of said ring moves said carriages along said guide means.

12. The pickup device of claim 11 wherein said frame has a brake thereon for selective engagement with said adjustment ring so that said adjustment ring can be held in position when not being adjusted.

13. The pickup device of claim 12 wherein said guide means comprises guide surfaces in said frame.

14. The pickup device of claim 13 wherein said guide surfaces are substantially rectangular guide surfaces and said carriages are substantially rectangular blocks, said carriages being bifurcated and having a cam follower extending between said bifurcation, said cam surfaces being spiral slots in said adjustment ring and said cam followers respectively extending through said spiral slots so that rotation of said adjustment ring causes motion of said carriages towards and away from each other.

15. A pickup device comprising:
   a frame for mounting upon a robot for positioning by the robot;

first and second carriages movably mounted on said frame to move towards and away from each other;

first and second pairs of levers respectively mounted on said first and second carriages, first and second pairs of fingers respectively mounted on said first and second pairs of levers, said carriages being adjustable on said frame to adjust the distance between said first and second pairs of fingers so as to permit picking up of parts of different body length wherein there is means on said frame for closing said pairs of fingers with respect to each other, said means applying substantially equal closing force to each of said pairs of fingers to provide for accommodation in diameters being grasped, wherein said means for closing said pairs of fingers comprises facing sloped cam surfaces on each of said pairs of levers and a closing pin engaging said cam surfaces so that when said pin is forced against said cam surfaces, each of said cam surfaces receives substantially the same force from said pin and said force of said pin against each of said cam surfaces corresponds to finger force.

16. The pickup device of claim 17 wherein said adjustment means for said carriages comprises a rotatable cam ring so that grasp of said cam ring and rotation of said frame causes adjustment of the spacing between said carriages so that the distance between said first and second pairs of fingers can be adjusted.

17. The pickup device of claim 16 wherein there is a sensor attached to said closing pin to indicate when material is not grasped upon the closing of said fingers.

* * * * *